Oct. 27, 1964    H. FRANKE ETAL    3,154,361
FLASH LAMP MOUNTING MEANS FOR CAMERAS
Filed May 23, 1961
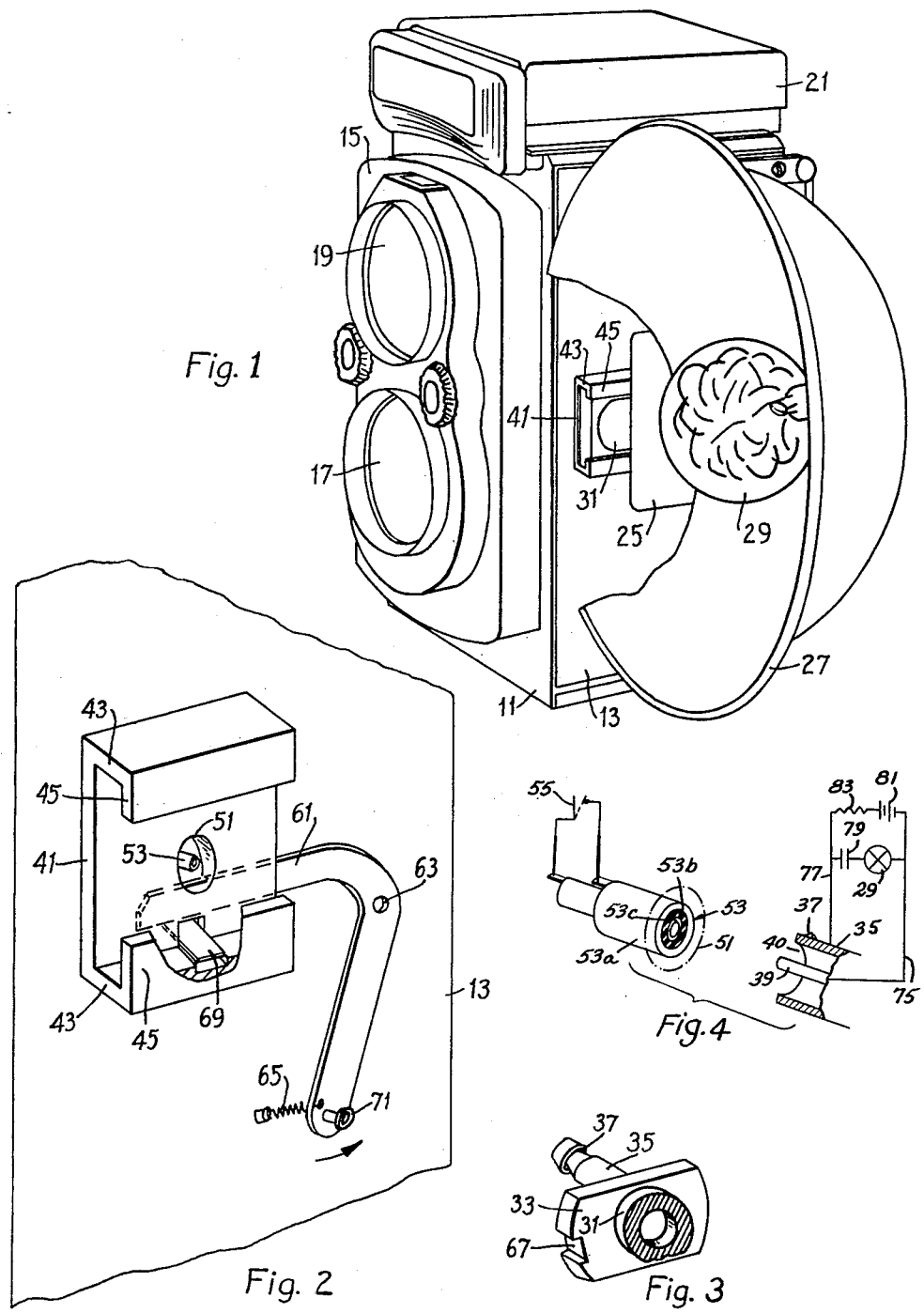

United States Patent Office 3,154,361
Patented Oct. 27, 1964

3,154,361
FLASH LAMP MOUNTING MEANS FOR CAMERAS
Horst Franke, Richard Weiss, and Claus Prochnow, Braunschweig, Germany, assignors to Franke & Heidecke, Fabrik Photographischer Präzisions-Apparate, Braunschweig, Germany, a firm of Germany
Filed May 23, 1961, Ser. No. 111,995
Claims priority, application Germany, June 1, 1960, F 18,543
7 Claims. (Cl. 339—91)

The present invention relates to the mounting of a flash lamp on a photographic camera.

An object of the invention is the provision of generally improved and more satisfactory means for mounting a flash lamp (sometimes called a flash gun) on a photographic camera.

Another object is the provision of mounting means so designed and constructed that the flash lamp may be mounted on the camera with great rapidity and ease, is securely held thereon, and may be rapidly and easily demounted and removed when desired.

Still another object is the provision of mounting means containing built-in separable electrical connections of permanent and rigid form, so designed as to eliminate the need for the flexible electrical cable heretofore customarily used for connecting the flash lamp to the electric circuit parts within the camera.

A further object is the provision of mounting means on the camera body so designed as to accept only flash gun fittings or mounting means of special form, rather than conventional form, thereby encouraging the photographer to use only the form of flash lamp especially designed and recommended by the camera manufacturer for use with this particular kind of camera, and discouraging the use of other kinds of flash lamps (e.g., conventional flash lamps) not recommended by the camera manufacturer and not having the special fitting or mounting means designed to mate with the special fitting or mounting means on the camera body.

A still further object is the provision of a shoe or fitting on the camera body, so constructed that it fulfills the above mentioned objects of the invention and that it also may be used as a mounting shoe for other accessory items such as a range finder or a light meter.

These and other desirable objects may be attained in the manner disclosed as an illustrative embodiment of the invention in the following description and in the accompanying drawings forming a part hereof, in which:

FIG. 1 is a perspective view of a camera and flash lamp according to a preferred form of the present invention, part of the flash lamp being broken away to show portions of the mating mounting means or fittings on the camera body and on the flash lamp, respectively;

FIG. 2 is a perspective view of the mounting means or fitting on the camera body, showing a fragment of the side wall of the camera; and FIG. 3 is a perspective view of the mating fitting or mounting means on the flash lamp, the latter being omitted for clarity.

FIG. 4 is an exploded perspective view illustrating the electrical connection parts, and showing diagrammatically the conventional electric circuits.

The mounting means of the present invention is especially suitable for laterally mounting a flash lamp on a side wall of a twin lens reflex camera of a kind well known and widely used in the United States and elsewhere. The camera body indicated in general at 11 has a stationary side wall 13, and a movable front member 15 shiftable forwardly and backwardly for focusing. The front member 15 carries the usual lower or picture-taking lens 17 and the upper or finder lens 19 which, by means of a conventional reflex mirror within the camera body, throws an image of the scene onto a focusing screen arranged horizontally at the top of the camera body, the focusing screen being visible when the conventional collapsible focusing hood 21 is erected or unfolded to its usual upstanding viewing position.

Passage of light through the exposure lens 17 and into the exposure chamber within the camera body is controlled by a conventional shutter having conventional flash synchronization means for closing an electric circuit switch in proper timed relation to the opening of the shutter blades, so that a flash lamp electrically connected to the switch will be illuminated or fired at the proper time synchronized with the making of the photographic exposure, when it is desired to take a photograph with flash light rather than natural light.

The parts thus far described are conventional, and the details thereof are not important for purposes of the present invention and are subject to wide variation.

The present invention relates to the manner in which the flash lamp is mounted on or attached to the camera body. Except for the attaching or mounting means, further described below, the other features of the flash gun or flash lamp itself may be of any conventional known kind, the details of which are unimportant for purposes of the present invention and thus may be widely varied. Merely as a typical example, the flash lamp may include a body portion 25 which carries a cup-shaped reflector 27 and a bulb socket in which a flash bulb 29 may be placed.

According to a preferred form of the present invention, the body portion 25 of the flash gun is rigidly connected, as by means of a neck 31, to a base plate 33, from the opposite face of which an electric plug pin or nipple 35 projects. At the free end of the plug pin is an annular bead 37 forming a retaining shoulder. The nipple may be of a conventional kind including a central metallic pin 39 located concentrically within and electrically insulated from the surrounding annular nipple portion 35.

Mounted on the side wall 13 of the camera body is an accessory mounting shoe including a flat plate 41 secured to and lying flat against the camera wall, upstanding flanges or walls 43 projecting outwardly perpendicular to the plate 41 at two opposite sides thereof, and two flanges 45 projecting toward each other (parallel to the plate 41 and to the side wall of the camera) from the outer ends of the upright flanges 43. Those familiar with accessory shoes as currently used on cameras will recognize the parts 41, 43, 45 as constituting a familiar form of such shoe.

For the sake of being able to use this shoe for mounting other accessories such as range finders or light meters, the shoe is preferably of the customary standard dimensions adapted to receive the standard size of foot customarily provided on such accessories. However, it has some important differences from the standard conventional shoe. The most important of these differences is that the plate 41 is provided with a central opening or aperture 51, mounted centrally within which aperture is an annular electrical contact pin 53 of the proper size to fit snugly within a central bore 40 in the contact plug or nipple 35 of the flash lamp. As is conventional, the contact pin indicated in general by the numeral 53 is of two parts, an outer metallic shell 53a which has a snug sliding fit within the nipple shell 35, and an inner metallic tube 53c the inside of which has a snug sliding fit on the metallic pin 39 of the nipple, the two parts 53a and 53c being electrically insulated from each other by an annular filling of insulating material 53b. The aperture 51 in combination with the pin 53 together constitute an electrical socket or receptacle of known form for receiving the nipple 35 and making proper electrical contact therewith. The socket is electrically connected in any conventional way to the synchronizer switch mechanism of the camera shutter, the synchronizer switch being schematically shown at 55 in FIG. 4. The camera preferably has no other externally accessible synchronizer plug or connection except the socket 51, 53.

In use, the flash lamp is attached to the camera by a lateral motion, thrusting the pin or nipple 35 on the flash lamp into the socket aperture 51 and impaling it on the pin 53. It will be noted that the base plate 33 of the flash lamp is wider than its length, and has arcuate ends. The width of the plate 33 will pass between the inturned flanges 45 on the camera, but the length will not pass through this space. Therefore, when applying the flash lamp to the camera, the lamp assembly must be turned so that the length of the plate 33 is parallel to the center line of the space between the flanges 45. In this position of orientation, the base 33 can pass freely between the flanges 45 and the plug pin 35 can be impaled fully onto the mating contact pin 53 of the camera body.

The second feature of difference of the shoe 41 from a conventional shoe of this kind is the presence of latching mechanism as described below. On completion of the inward thrusting motion, one edge of a latching lever 61, pivoted to the camera body at 63 and extending into a milled recess in the shoe, snaps behind the latching bead or shoulder 37 under the influence of the latching spring 65 and thus retains the flash lamp against accidental lateral movement outwardly away from the camera body. The flash lamp is now turned a quarter turn or 90 degrees about the axis of the pins 35 and 53. This rotates the base plate 33 of the flash lamp within the shoe on the camera body, so that the ends of the base plate swing into the spaces behind the flanges 45, these flanges now serving as additional retaining means (in addition to the latching lever 61) to prevent lateral outward movement of the flash lamp.

One of the curved ends of the base plate 33 has a latching notch 67, and when the above mentioned quarter turn of the lamp has been completed, this notch 67 comes into alinement with an ear or lug 69 on the latching lever 61, so that the ear snaps into the notch under the influence of the spring 65, and latches the flash lamp against rotation, the edge of the lever 61 simultaneously snapping again into latching position behind the shoulder or bead 37. In this position of orientation, the reflector 27 is faced forwardly so that the illuminating axis of the lamp is parallel to the optical axis of the camera. This assures that the lamp is properly placed to illuminate the subject being photographed, and can not be accidentally displaced from this position.

When the lamp is to be removed from the camera, the latch lever 61 must first be released, against the force of the spring 65, by pressure applied to the finger piece or release knob 71. This releases the ear 69 from the notch 67, so the flash assembly may be turned 90 degrees. Then (if the latching lever 61 is again moved to a released position, to withdraw it from behind the shoulder 37) the lamp assembly can be withdrawn laterally from the camera body.

Placing the lamp on the camera body automatically establishes the electrical connection to the synchronizer switch in the shutter, and removing the lamp simultaneously disconnects the electrical connection. Thus it is not necessary to use a separate flexible cable, and not necessary to perform the extra operation of plugging the cable into a socket on the camera, or unplugging it therefrom, as has been required heretofore.

The latching lever 61 and its spring 65 are preferably enclosed within the outer wall or housing of the camera body, only the finger piece or actuating knob 71 protruding through a slot to an accessible position. However, for the sake of clarity of illustration, these parts have been shown in FIG. 2 as being on the outside of the camera.

It will be noted that although the shoe 41, 43, 45 is of standard size so that it can be used for mounting other accessories, it can not be readily used for mounting a conventional flash lamp, for the reason that when the mounting foot of a conventional flash lamp is placed in the shoe, it would completely cover the socket 51, 53, and would render the electrical connection inaccessible, so there would be no place where the electrical connection cord of the lamp could be plugged into the camera. In an emergency, a conventional flash lamp could have its cable plugged onto the connection 51, 53, and the lamp itself could be held in the hand or mounted on the camera in some way other than by means of the shoe. The possibility of using the electrical connection with a conventional flash gun is, of course, a valuable feature in an emergency, but the present invention purposely discourages such use except in an emergency, by making it impossible to mount a conventional flash lamp in the shoe. Thereby the invention encourages the use of the special flash lamp recommended by the camera manufacturer as being most suitable for the particular camera, which recommended lamp would, of course, be equipped with the special mounting means mating with the special mounting means on the camera body, enabling full advantage to be taken of the ease and speed of mounting and demounting in accordance with this invention.

In the preferred form of the invention as described above, the flash lamp is mounted on and supported from the camera body in two ways: first, by the mechanical strength of the nipple 35, rigidly attached to the lamp and firmly held in the socket 51, 53 by means of the latch 61; and second, by the base plate 33 firmly engaged in the shoe 41, 43, 45. While both of these mechanical connections or supports are preferably used in combination with each other, it is nevertheless within the contemplation and scope of the invention to utilize the rigidly mounted nipple 35 as the sole mechanical support for the flash lamp, without employing the plate 33 or the shoe on the camera. Also it is apparent that the electrical socket (and the shoe, if it is also used) may be placed in any desired location on any wall of the camera.

The electrical connections from the nipple 35 to the flash lamp 29 are conventional and the details are not important for purposes of the present invention. Merely as an example, the connections may include an electrical conductor 75 leading from the central pin 39 of the nipple to one side of the lamp 29, and a conductor 77 leading from the shell 35 of the nipple to the other side of the lamp, through a condenser or capacitor 79. Arranged in parallel with the lamp 29 and capacitor 79 are a battery 81 and a resistance 83, so that the capacitor 79 is normally kept charged by the battery 81. When the synchronizer switch 55 is closed, the capacitor 79 is discharged through the lamp, causing the desired illuminating flash.

It is seen from the foregoing disclosure that the above mentioned objects of the invention are well fulfilled. It is to be understood that the foregoing disclosure is given by way of illustrative example only, rather than by way of limitation, and that without departing from the invention, the details may be varied within the scope of the appended claims.

What is claimed is:

1. Flash lamp mounting means comprising a socket mounted on the outer wall of a camera case, said socket having a supporting plate engaging said wall formed with upstanding flanges at opposite ends and inwardly extending flanges at the outer ends thereof in spaced parallel relation to said plate, said inwardly extending flanges terminating in predetermined spaced relation at opposite sides of the center of said plate, said plate being formed with a central aperture, a contact pin having one end mounted in the center of said aperture, a flash lamp holder having a plug formed to slidably engage in said central aperture having a central contact engaging said contact pin, and a base plate mounted on said plug with opposite ends extending in substantially transverse diametrical relation outwardly from opposite sides of an intermediate portion thereof, said base plate having a width less than the distance between the ends of said inwardly extending flanges for movement into said socket to engage said plate, and said plug being rotatable in said socket for engaging the ends of said base plate under said inwardly extending flanges for detachably locking said flash lamp holder in said socket.

2. A construction as defined in claim 1, wherein manually operable latch means has complementary parts on said plug and in association with said plate for retaining said plug in said socket against accidental disengagement.

3. A construction as claimed in claim 1, wherein said plug has a cylindrical outer contact engaging in said central aperture with said supporting plate, having the free end extending through and beyond said supporting plate and formed with a shoulder in the rear of said supporting plate, said base plate having a latch member formed on one end thereof, and a latch lever pivoted on said outer wall of said camera having latch portions on one end engaging said shoulder and latch member in the latching position thereof for retaining said plug member engaged in said socket against rotation with the ends of said base plate engaged under said inwardly extending flanges to retain said plug member engaged with said supporting plate and the opposite end of said latch lever forming a handle for manual operation to move said lever into and out of position for latching said plug to said supporting plate.

4. Mounting means for detachably supporting a flash lamp from a photographic camera and connecting the flash lamp electrically to the camera, said mounting means comprising a mounting shoe rigidly mounted on a wall of the camera, said shoe including two flanges spaced from and parallel to each other, an electric socket located substantially centrally in said shoe, said socket having an axis substantially perpendicular to the camera wall on which said shoe is mounted, and a mounting foot and an electric plug member both rigidly mounted on said flash lamp, said plug member being shaped to be thrust axially into said socket and to make electrical contact therewith and to be rotatable therein, said mounting foot having a width less than the space between said two flanges of said shoe and having a length greater than said space, so that said flash lamp may be applied to said camera by moving it laterally toward said wall of said camera body to thrust said plug into said socket while said lamp is oriented in such position that the width of said foot may pass between said flanges of said shoe, and so that said flash lamp may then be turned about the axis of said socket to a different position of orientation so that the ends of said foot underlie said flanges to be retained thereby against lateral outward movement away from said wall of said camera.

5. A construction as defined in claim 4, further including latching means for releasably latching said foot and said lamp in said different position of orientation and preventing rotation thereof away from said different position.

6. A construction as defined in claim 5, in which said latching means comprises a notch in said mounting foot, and a spring pressed latching member mounted on the camera and engaging in said notch to latch said foot against rotation.

7. A construction as defined in claim 6, further including a shoulder on said plug, and in which said spring pressed latching member has a portion engaging said shoulder to latch said plug against withdrawal from said socket.

References Cited in the file of this patent

UNITED STATES PATENTS

| | | |
|---|---|---|
| 753,276 | Kimbark | Mar. 1, 1904 |
| 2,275,533 | Landy | Mar. 10, 1942 |
| 2,749,819 | Weiss | June 12, 1956 |
| 2,872,857 | Rich et al. | Feb. 10, 1959 |